2,916,524
Patented Dec. 8, 1959

2,916,524

PRODUCTION OF BUTYLATED PHENOL

Johannes Reese, Wiesbaden-Biebrich, Germany, assignor to Chemische Werke Albert, Wiesbaden-Biebrich, Germany, a corporation of Germany No Drawing. Application May 21, 1957
Serial No. 660,446

Claims priority, application Germany June 4, 1956

7 Claims. (Cl. 260—624)

This invention relates to the production of butylated phenol from "butyl rubber."

It is known that isomerized rubber can be produced from natural rubber (polyisoprenes) by heating in the presence of phenol and a catalyst.

Now it has been found that butylated phenol can be produced from "butyl rubber," containing varying amounts of isoprene, by heating the "butyl rubber" in the presence of a boron fluoride catalyst including boron fluoride itself, or its addition compounds such as boron fluoride etherate or compounds of boron fluoride with acetic acid, phenol, or the like. Yet, under the same conditions, it is not possible to produce a butylated phenol from a polymer derived from isobutylene itself, i.e., polyisobutylene. In the light of prior art knowledge concerning the production of isomerized rubber and the experience with polyisobutylene per se, the reactions of this invention and the operability of the process are unobvious and unexpected.

In the process of this invention, commercially available "butyl rubber" may be used. Those containing from 0.8 to 3% of copolymerized isoprene have proven to be especially suitable for the reaction. A very small amount of isoprene is sufficient to induce the formation of the butylated phenol. "Butyl rubbers" containing larger than 3% isoprene can be used but no advantage flows therefrom since a smaller yield of the butylated phenols would be obtained from the same quantity of raw material. Moreover, 3% isoprene is normally sufficient for the production of commercial "butyl rubber."

Phenol itself, or its substitution products which are stable under the reaction conditions and are unsubstituted in their ortho or para positions may be used in the reaction. For instance, monohalogenated phenols can be converted into the corresponding tertiary butyl halogen phenols. Likewise, cresols or xylenols, or other alkylated phenols may be used, provided they are not substituted in both the ortho and para positions.

The reactions of this invention may be carried out at elevated temperatures either in the presence or the absence of solvents. Highly elevated temperatures are not necessary since the butylene is made available and the alkylation of the phenol takes place at readily attainable temperatures such as those normally used in the formation of butylated phenols. Where the reaction is carried out in the absence of solvents, it is normally carried out at the boiling point of the phenol used. Where a solvent is used, the reaction is normally carried out at the boiling point of the solvent. Xylene has proven a very satisfactory solvent, but its lower or higher homologues may be used. When using solvents it is not necessary to dissolve the "butyl rubber" in the solvent. It is only necessary to heat the "butyl rubber" in its solid form and the phenol in the presence of the solvent, advantageously with agitation.

Even vulcanized "butyl rubber" can be used in the process of this invention. Apparently the filling materials, such as carbon black, vulcanization accelerators, etc., in no way interfere with the reaction. The suitability of vulcanized "butyl rubber" for use in the process hereof constitutes an important practical feature of the invention since vulcanized "butyl rubber," such as found in tubes has heretofore been relatively useless.

Butylated phenols produced in accordance with this invention are predominantly mono- tertiary butylated phenols. However, other higher butylated phenols are produced and some oligomeres of isobutylene are formed also.

In the process of this invention, the quantity of the butylated phenol produced is dependent upon the proportion of the isobutylene copolymerized with the isoprene as well as upon the quantity of the phenol used in the reaction.

In the process hereof, it is advantageous to maintain conditions under which reaction will continue until the "butyl rubber" content, or the phenol content, of the reaction mass has been consumed in the reaction. Then the boron catalyst is neutralized, in a known manner, with soda, or the like. Thereafter, after filtration, the solution is advantageously subjected to a distillation in a vacuum or with steam. The various butylated phenols can be separated from any unreacted phenol or from one another in a known manner.

After the separation of butylated phenols there mostly remains, as a by-product, a low-viscous resin-like residue which is not distilled off. This by-product can be reused in the process whereby an increased yield of butylated phenol may be obtained. On the other hand, it may be used, for instance, as a glue.

The butyl phenols obtained in the process of this invention can be used for known purposes. For example, they can be used as raw materials in the production of lacquers, antioxidants, fungicides, or as intermediate products for the production of textile auxiliaries, and the like.

A theory of the nature of the reaction which takes place in the process hereof is not necessary for an understanding of the invention. Yet, an understanding of the apparent course of the reaction will lead to an appreciation of the scope of the invention. Thus it may be assumed that in the first phase of the reaction, after previous protonization of the tertiary C-atoms found at the double bonds, a depolymerization of the copolymerizate takes place thereby freeing isobutylene which, under the conditions of the reaction, immediately reacts with the phenol. In other words, the reaction may be attributable, in part at least, to the presence of nascent butylene. This conclusion is supported by the fact that very small quantities of copolymerized isoprene in the "butyl rubber" are sufficient to make the reactions of this invention possible. Obviously, therefore, very few proton active double bonds in the molecular chain are sufficient to initiate the splitting of the molecule.

The following illustrative examples will further serve to create an understanding of the invention. In the examples, and elsewhere herein, parts are expressed as parts by weight.

*Example 1*

Two hundred (200) parts of "butyl rubber" containing 2.5% isoprene (Enjay 215) are fed in small pieces into a mixture of 300 parts of xylol and 200 parts of phenol and 20 parts of boron fluoride etherate. After vigorously stirring and boiling the resulting mass for eight hours the catalyst is neutralized with 30 parts of sodium carbonate. Then the liquids are filtered off. By distillation, 210 parts of tertiary butyl phenol and 52 parts of higher boiling butyl phenol are recovered from the filtrate. Also, the xylol is distilled off and recovered, The residue from the distillation constitutes 83 parts of a resin-like substance.

Under the same conditions as illustrated in this example, a polymerizate derived from isobutylene per se and having a molecular weight of 100,000 can not be split up.

Example 2

The process of Example 1 was followed but 200 parts of p-chlorphenol were used in place of the phenol. In addition to o-tertiarybutyl-p-chlorphenol, which is formed in a quantity of 100 parts, larger quantities of hydrocarbons are formed which appear to represent oligomeres of isobutylene. There remains a resin-like residue of only about 18 parts.

Example 3

In this example 50 parts of vulcanized "butyl rubber" (used automobile tubes) are used. The used tubes contained about 35% of non-rubber-like materials including 1.3% sulfur. Under vigorous agitation, 50 parts of used tubes, 50 parts of phenol and 5 parts of boron fluoride etherate are heated in an oil bath up to 180° C. After six hours, the dark conversion product is neutralized with sodium carbonate and distilled with steam whereby unchanged phenol and the tertiarybutyl-phenol passes over. About 27 parts of tertiarybutyl phenol are obtained.

It should be understood that the present invention is not limited to the exact conditions and procedures described above but that it extends to all equivalents which would occur to those skilled in the art upon consideration of this disclosure and the claims appended hereto.

I claim:

1. A process for producing butylated phenol which comprises heating a phenol unsubstituted in at least one of its para and ortho positions with a rubber copolymer of isobutylene and 0.8 to 3% isoprene in the presence of a boron fluoride catalyst at a temperature depolymerizing said rubber copolymer and butylating said phenol, said heating continuing until butylated phenol is produced.

2. A process for producing butylated phenol which comprises heating at a boiling temperature a phenol unsubstituted in at least one of its para and ortho positions with a vulcanized rubber copolymer of isobutylene and 0.8 to 3% isoprene in the presence of a boron fluoride catalyst until said rubber copolymer depolymerizes and until butylated phenol is produced.

3. A process for producing butylated phenol which comprises heating a phenol unsubstituted in at least one of its para and ortho positions with a rubber copolymer of isobutylene and 0.8 to 3% isoprene in the presence of boron fluoride at a temperature depolymerizing said rubber copolymer and butylating said phenol, said heating continuing until butylated phenol is produced.

4. A process for producing butylated phenol which comprises heating a phenol unsubstituted in at least one of its para and ortho positions with a rubber copolymer of isobutylene and 0.8 to 3% isoprene in the presence of boron fluoride etherate at a temperature depolymerizing said rubber copolymer and butylating said phenol, said heating continuing until butylated phenol is produced.

5. A process for producing butylated phenol which comprises heating a phenol unsubstituted in at least one of its para and ortho positions with a rubber copolymer of isobutylene and 0.8 to 3% isoprene in the presence of the addition compound of boron fluoride and acetic acid at a temperature depolymerizing said rubber copolymer and butylating said phenol, said heating continuing until butylated phenol is produced.

6. A process for producing butylated phenol which comprises heating a phenol unsubstituted in at least one of its para and ortho positions with a rubber copolymer of isobutylene and 0.8 to 3% isoprene in the presence of the addition compound of boron fluoride and phenol at a temperature depolymerizing said rubber copolymer and butylating said phenol, said heating continuing until butylated phenol is produced.

7. A process for producing butylated phenol which comprises mixing a phenol unsubstituted in at least one of its para and ortho positions, a rubber copolymer of isobutylene and 0.8 to 3% isoprene, boron fluoride etherate, an aromatic hydrocarbon solvent and heating the mixture at boiling temperatures of the aromatic hydrocarbon until butylated phenol is produced.

References Cited in the file of this patent

UNITED STATES PATENTS

| | | |
|---|---|---|
| 2,091,565 | Perkins et al. | Aug. 31, 1937 |
| 2,390,951 | Leum et al. | Dec. 11, 1945 |
| 2,498,999 | Offutt | Feb. 28, 1950 |

OTHER REFERENCES

Calloway: Chem. Rev., vol. 17, pp. 374–75 (1935).

Slobodin et al.: Chem. Abstracts, vol. 41 (1947), pp. 7803–04.

Boonstra et al.: Ind. and Eng. Chem., vol. 41 (1949), pp. 166 and 167.

Madorsky et al.: Jour. Research, Nat. Bur. Stand., vol. 42 (1949), pp. 502–03 (Research Paper RP-1989).